United States Patent
Sasso et al.

(10) Patent No.: US 10,836,523 B2
(45) Date of Patent: Nov. 17, 2020

(54) TRAY FILLING APPARATUS FOR LEAFLETS

(71) Applicant: THE CHALLENGE PRINTING COMPANY, Clifton, NJ (US)

(72) Inventors: Chad Sasso, Cary, NC (US); Kevin Thies, Lake Hopatcong, NJ (US); James Velez, Apex, NC (US); Margaret Polt, Cary, NC (US)

(73) Assignee: The Challenge Printing Co., Clifton, NJ (US)

( * ) Notice: Subject to any disclaimer, the term of this patent is extended or adjusted under 35 U.S.C. 154(b) by 167 days.

(21) Appl. No.: 16/282,983

(22) Filed: Feb. 22, 2019

(65) Prior Publication Data
US 2019/0263551 A1    Aug. 29, 2019

Related U.S. Application Data

(60) Provisional application No. 62/635,836, filed on Feb. 27, 2018.

(51) Int. Cl.
*B65B 35/50* (2006.01)
*B65B 35/36* (2006.01)
(Continued)

(52) U.S. Cl.
CPC .............. *B65B 35/50* (2013.01); *B65B 5/108* (2013.01); *B65B 25/143* (2013.01); *B65B 35/36* (2013.01); *B65B 43/265* (2013.01); *B65G 61/00* (2013.01)

(58) Field of Classification Search
CPC ......... B65B 5/068; B65B 5/105; B65B 5/108; B65B 25/143; B65B 25/145; B65B 35/36; B65B 35/50; B65G 61/00
(Continued)

(56) References Cited

U.S. PATENT DOCUMENTS 2,919,528 A  *  1/1960  White ..................... B65B 63/02
                                                              53/527
2,996,859 A  *  8/1961  Winkler et al. ....... B65B 25/141
                                                              53/529
(Continued)

FOREIGN PATENT DOCUMENTS

DE           3626977 A1  *  2/1988  ............... B67B 5/06
GB           2454166 A        5/2009
(Continued)

OTHER PUBLICATIONS

EP Search Report issued in EP Application No. EP19159365.6, dated May 29, 2019.

*Primary Examiner* — Stephen F. Gerrity
(74) *Attorney, Agent, or Firm* — Greer Burns & Crain Ltd.

(57) ABSTRACT

Leaflets are stacked horizontally in a stacker tray after folding, with the leaflets themselves aligned in a vertical orientation. A tray transport platform supports a plurality of tray sleeves and a plurality of corresponding trays located adjacent to the stacker tray. The trays can slide into the tray sleeves as each tray is filled with leaflets. A robot gripper is adapted to be selectively placed inside the stacking tray. The gripper captures a batch of the leaflets as they are stacked, and places them in a selected tray. A sleeve holder is selectively placed in and removed from the selected tray to control entry of the leaflets into a corresponding tray sleeve, and a stuffer pushes each batch of leaflets inside of the sleeve. A controller operates the components of the apparatus so that the leaflets are transferred from the stacker machine to trays without human labor.

10 Claims, 21 Drawing Sheets

(51) Int. Cl.
*B65B 25/14* (2006.01)
*B65B 5/10* (2006.01)
*B65B 43/26* (2006.01)
*B65G 61/00* (2006.01)

(58) Field of Classification Search
USPC ... 53/55, 527, 529, 531, 534, 540, 542, 169, 53/255, 257
See application file for complete search history.

(56) References Cited

U.S. PATENT DOCUMENTS

| | | | | |
|---|---|---|---|---|
| 4,873,813 | A | * | 10/1989 | Labombarde et al. ........................ B65B 25/141 53/542 |
| 7,213,386 | B2 | * | 5/2007 | Hooper .................. B65B 5/108 53/542 |
| 8,226,345 | B2 | * | 7/2012 | De Leo .................. B65B 35/50 53/540 |
| 2005/0189197 | A1 | * | 9/2005 | Iwasa et al. ............ B65B 5/061 53/542 |
| 2006/0053754 | A1 | * | 3/2006 | Carrigan et al. ........ B65B 5/105 53/529 |
| 2011/0030318 | A1 | | 2/2011 | Moylan et al. |
| 2016/0059972 | A1 | * | 3/2016 | Nagata et al. .......... B65B 5/108 53/544 |

FOREIGN PATENT DOCUMENTS

| | | | |
|---|---|---|---|
| JP | 06040406 | A * | 2/1994 |
| JP | 06056107 | A * | 3/1994 |
| WO | 9620869 | A1 | 7/1996 |

\* cited by examiner

TRAY FILLING APPARATUS FOR LEAFLETS

This application claims the benefit of provisional patent application Ser. No. 62/635,836, filed Feb. 27, 2018.

This invention relates to packaging equipment, and more particularly to automated tray filling apparatus for leaflets that are later placed on labels or containers.

BACKGROUND

Products such as pharmaceuticals require extensive instructions and warnings, and they are often sold in fairly small containers. For many such products, a single piece of paper is printed with the instructions and warnings, folded into a leaflet and adhered to the container itself. Sometimes the leaflet is adhered to a label that is in turn adhered to the container.

A folding machine makes the leaflets, which are stacked in a stacking tray. The leaflets are transferred to an open tray in a carton having a sleeve into which the tray fits as batches of leaflets fill the stacking tray. When the carton tray is filled, it is moved for further processing. However, the carton trays are filled by hand, which is slow and inefficient. Thus, there is a need for an apparatus that fills carton trays with leaflets without human labor.

Accordingly, an object of this invention is to provide new and improved apparatus for filling carton trays with leaflets.

Another object is to provide new and improved apparatus that fills carton trays with leaflets without human labor.

SUMMARY OF THE INVENTION

In accordance with one aspect of this invention, as defined in the claims, leaflets are stacked horizontally in a stacking tray after folding, with the leaflets aligned in a vertical orientation. A tray transport platform supports a plurality of cartons, each having a carton tray and a corresponding sleeve into which the carton tray slides. The carton trays can slide into the tray sleeves as each carton tray is filled with a number of leaflets such as 100 leaflets. Each carton tray is sufficiently secured inside its corresponding tray sleeve so that each carton tray can be removed from the tray transport platform for further processing without spilling.

A robotic arm has a robotic gripper adapted to be selectively placed inside the stacking tray. The robotic gripper captures a batch of the leaflets (10, for example) removes the leaflets from the stacking tray, and places the batch in a selected carton tray. As the leaflets are placed in the carton tray, another batch of leaflets is fed into the stacking tray. Vertical orientation of the leaflets in the stacking tray is maintained by a spring loaded end stop.

A sleeve holder is selectively placed in and removed from the selected carton tray to control entry of the batch of leaflets into the corresponding carton tray sleeve, and keeps the leaflets already inside the sleeve in a vertical orientation. The end of the carton tray that is inside of the sleeve also keeps those leaflets in a vertical orientation. A stuffer pushes the batch of leaflets inside of the sleeve when the batch of leaflets is present and the sleeve holder is removed from the selected carton tray. The sleeve holder has two legs spaced from each other by an opening. The stuffer has an arm that extends down into the carton tray, and an extension that fits between the sleeve holder legs. The extension has a length greater than the thickness of the sleeve holder. When the leaflet stuffer pushes the batch of leaflets inside of the carton sleeve, a space is created between the end of the carton sleeve and the arm of the stuffer. The sleeve holder is then placed in that space, and the leaflet stuffer is withdrawn to its original position, where it waits for another batch of leaflets.

When the carton tray is filled with the last batch, the leaflet stuffer is pulled out of the carton tray and pushes the outside end of the carton tray into the sleeve so that the closed carton can be removed and the process can be repeated. A computer controller operates the components of the apparatus. In this manner, the leaflets are maintained in a vertical orientation, and they are transferred from the stacking tray to the carton trays without human labor.

BRIEF DESCRIPTION OF THE DRAWINGS

The above mentioned and other features of this invention and the manner of obtaining them will become more apparent, and the invention itself will be best understood by reference to the following description of an embodiment of the invention taken in conjunction with the accompanying drawings, in which.

DETAILED DESCRIPTION

Figure 1:
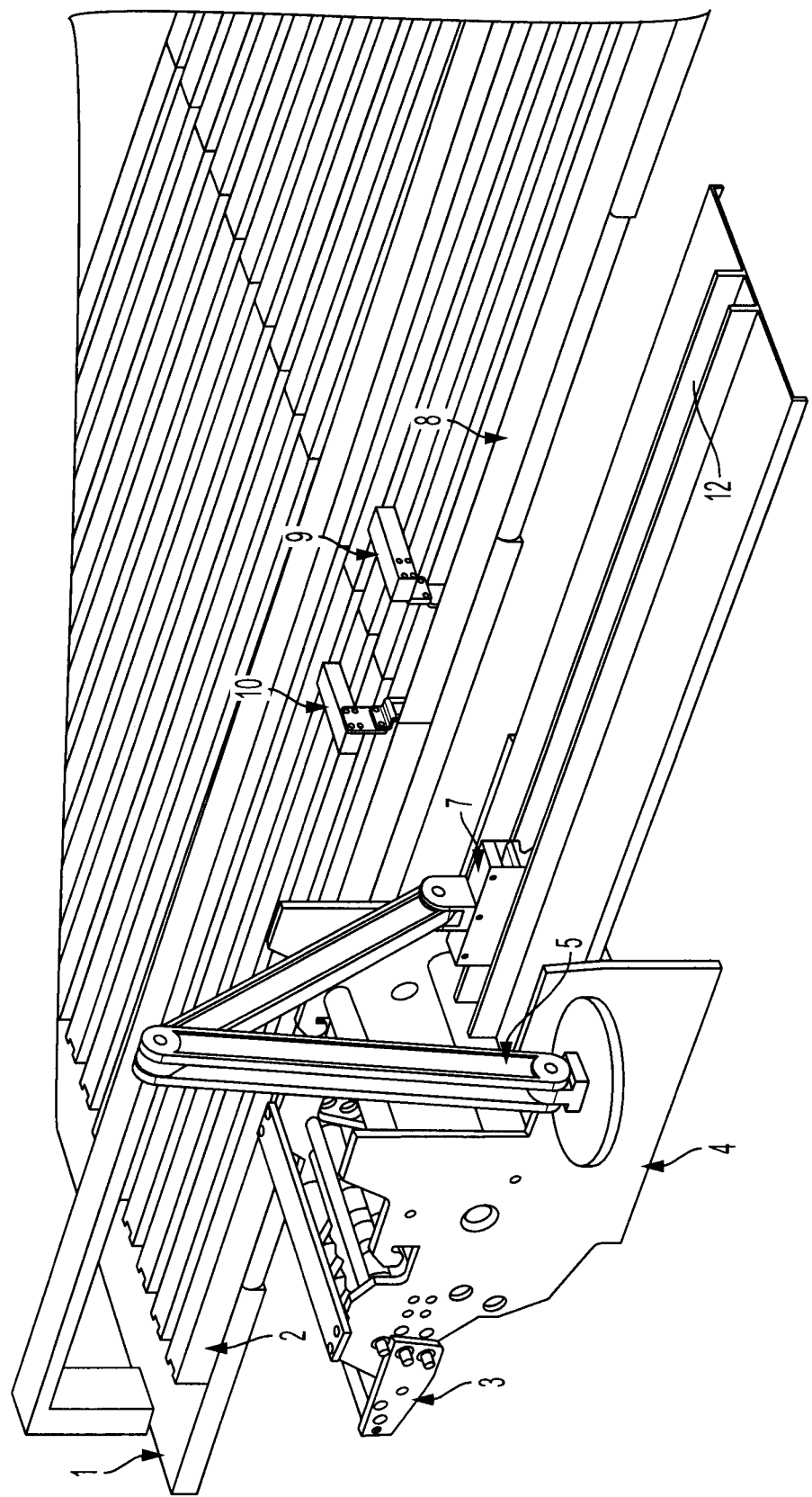
FIG. 1 is a perspective view of a tray filling apparatus for leaflets.

As seen in FIG. 1, a tray transport platform 1 supports a plurality of tray sleeves 2 and trays 8. The trays 8 slide into the sleeves 2 as the trays 8 are filled with leaflets, as will be seen. As each tray 8 is filled with leaflets and secured inside its tray sleeve, it can be removed for further processing. The leaflets are typically placed on bottles with adhesive, or on labels that are adhered to products such as prescription drugs.

The leaflets are made by a conventional folding apparatus that includes a stacker transfer machine 3 having a stacker 4. The stacker 4 is provided with a stacking tray 12 which stacks folded leaflets horizontally, with the leaflets themselves in a vertical orientation, as will be seen.

Figure 2:
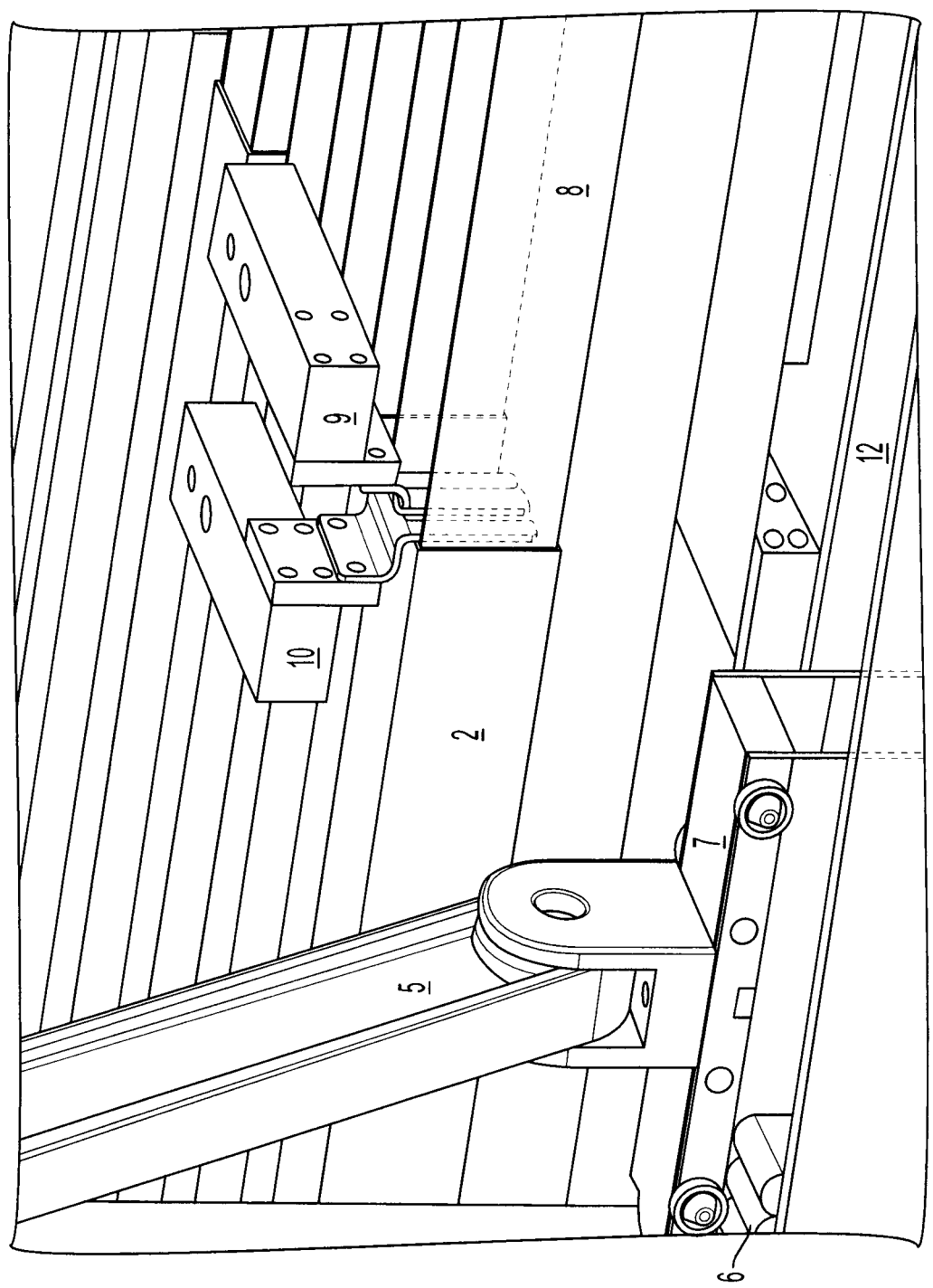
FIG. 2 is a perspective view of a robotic gripper, before starting the process of filling the robotic gripper.
Figure 3:
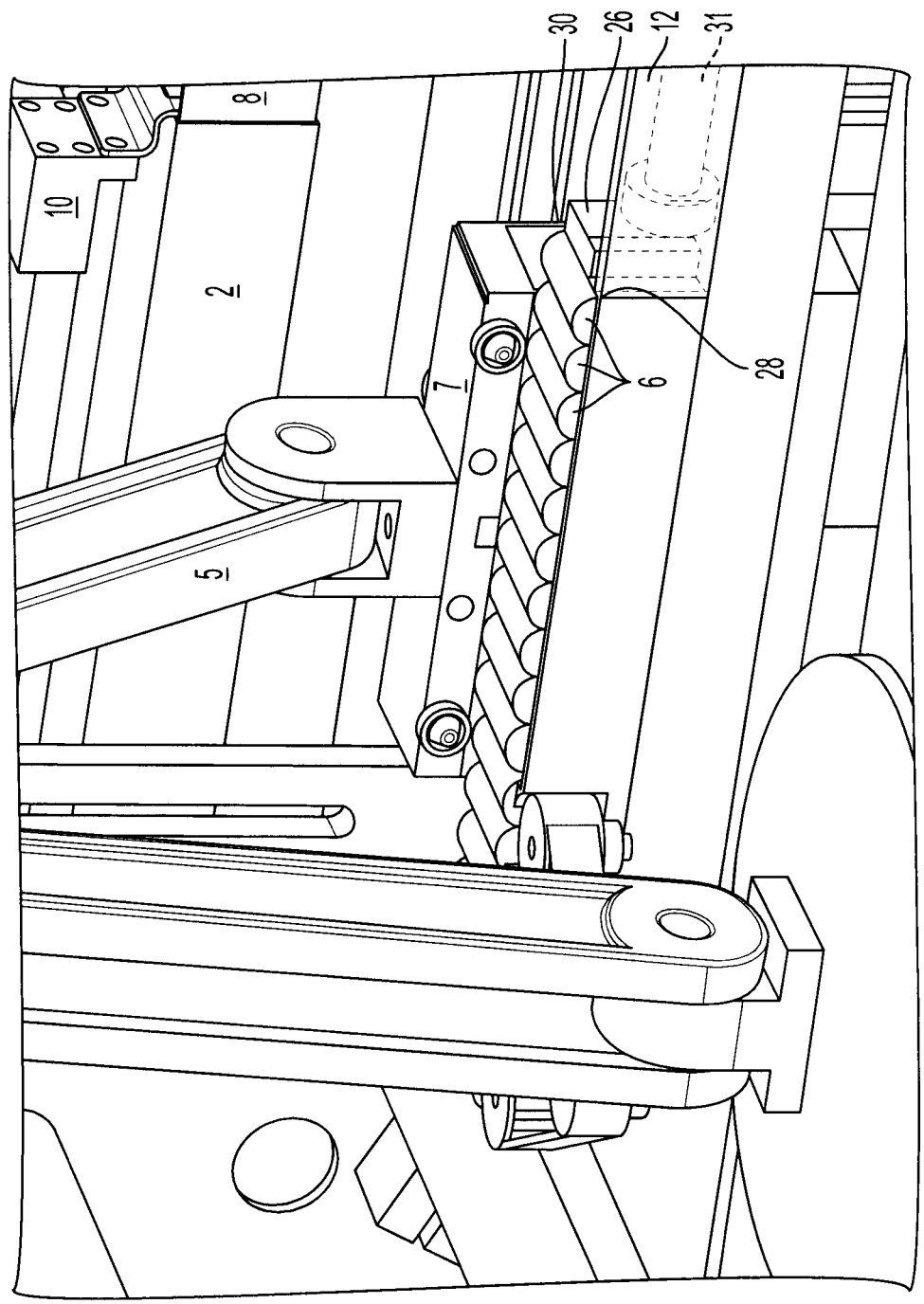
FIG. 3 is a perspective view of the robotic gripper without a side plate, shown filled with leaflets.

A robotic arm 5 has a robotic gripper 7 that fits inside the stacking tray 12, and captures leaflets 6 as they are stacked, as seen in FIGS. 2 and 3. The robotic arm 5 is controlled by a robotic motion controller and a programmed computer or programmable logic controller. Sensors are provided to indicate when inserts (leaflets) should be picked.

Figure 4:
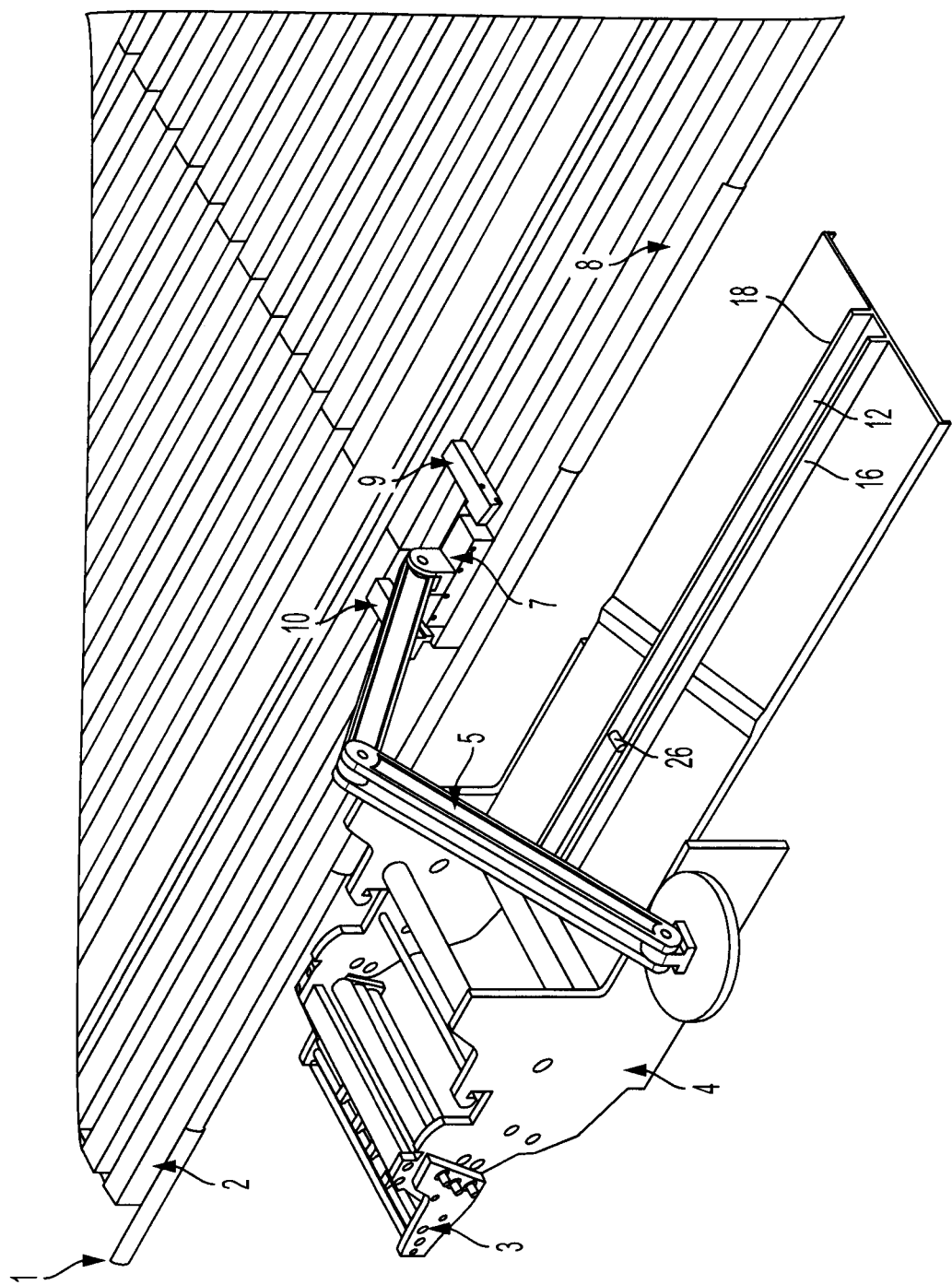
FIG. 4 is a perspective view of the robotic gripper, shown transferring leaflets to a tray.
Figure 5:
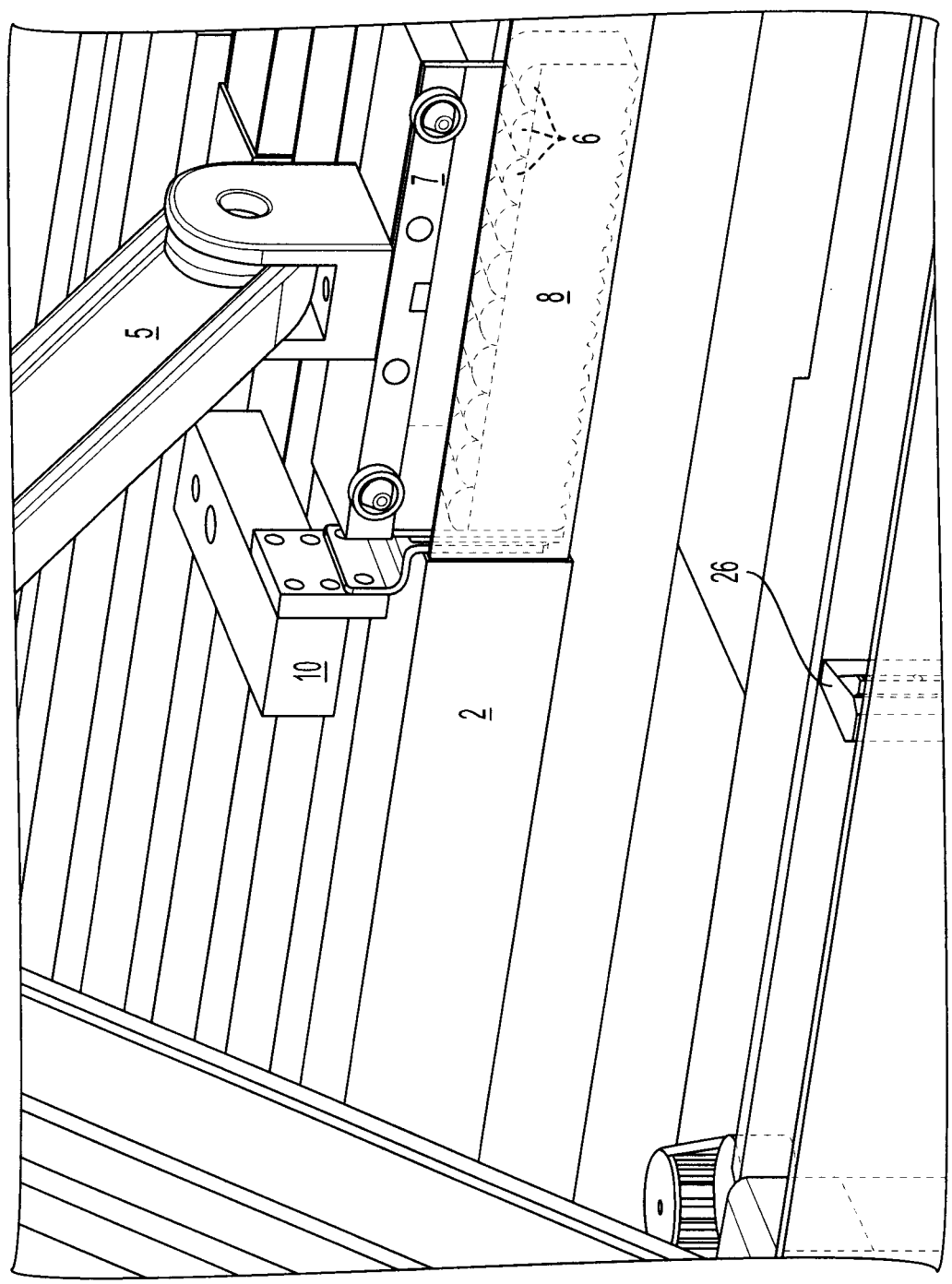
FIG. 5 is a close-up perspective view showing the robotic gripper transferring leaflets to the tray.

In FIG. 3, the robotic gripper 7 is filled with leaflets 6. When the robotic gripper 7 has a predetermined number (a batch of perhaps 10) of leaflets 6, the robotic arm 5 lifts the robotic gripper 7 from the stacking tray 12 and places the robotic gripper 7 in a selected tray 8, as see in FIGS. 4 and 5. The leaflets 6 are held in the robotic gripper 7 at that time.

Figure 6:
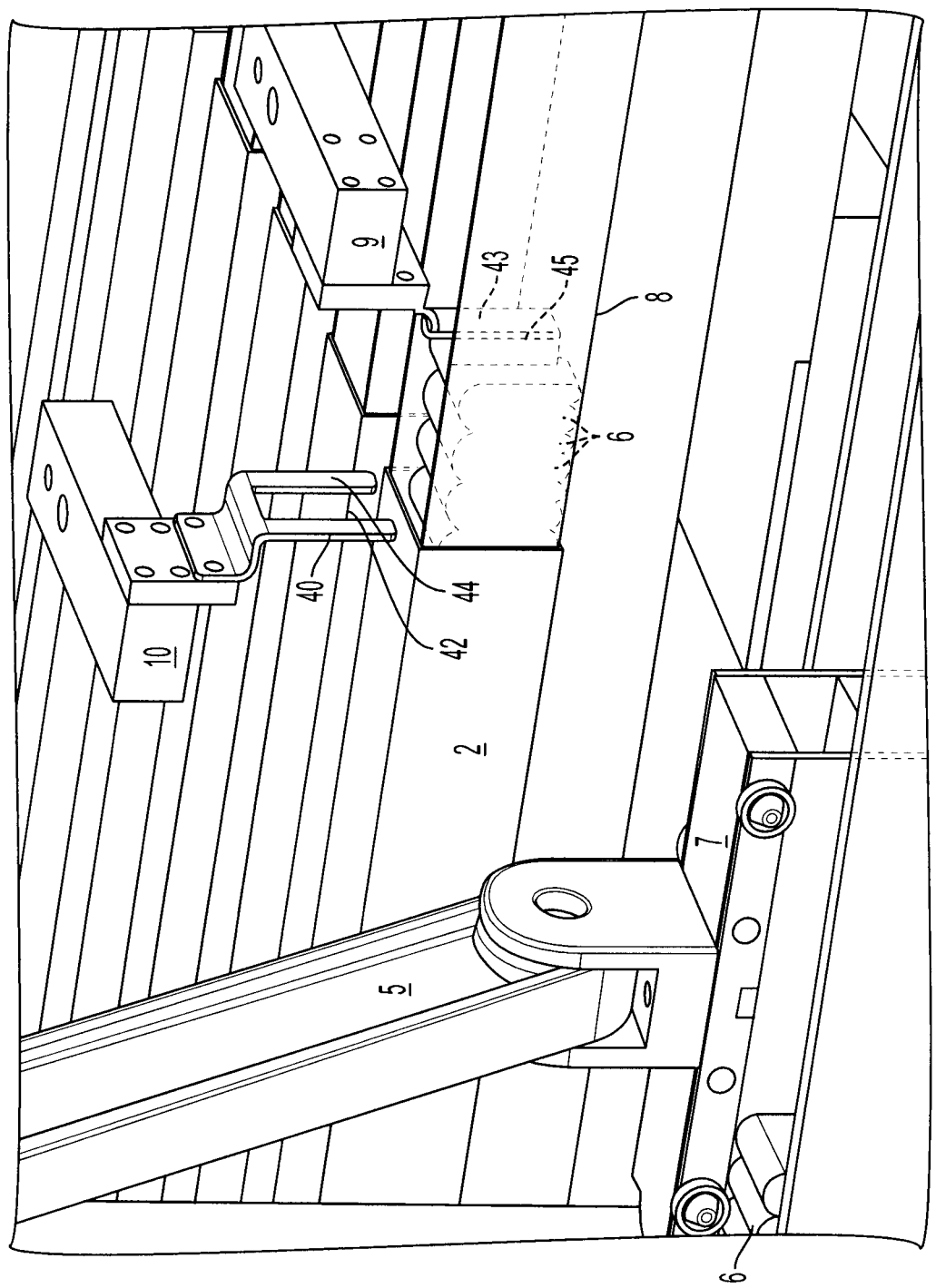
FIG. 6 is a perspective view showing an insert stuffer pushing leaflets into a sleeve.

When the leaflets 6 are released in the carton tray 8 by the robotic gripper 7, the robotic gripper 7 is lifted away by the robotic arm 5, a sleeve holder 10 is lifted out of the tray 8, and an insert (leaflet) stuffer 9 pushes the leaflets 6 into the carton sleeve 2, as seen in FIG. 6. When all of the leaflets have been pushed into the carton sleeve 2, the sleeve holder 10 returns to the tray 8, as seen in FIG. 1, and the insert stuffer 9 returns to the position shown in FIG. 8A. The robotic gripper 7 returns to the stacking tray 12 for refilling, and the process is repeated. In this manner, leaflets 6 are transferred from the stacker 4 to trays 8 automatically, without human intervention or labor.

The carton tray 8 has an inside end 51 (FIGS. 8A, 8B) that is just inside of the carton sleeve when the filling process begins, and another end (not shown) that is outside of the carton sleeve. When the process starts, the inside end is adjacent the entrance to the carton sleeve 2. As the carton tray is filled with batches of leaflets, the inside end 51 is pushed further into the carton sleeve 2 until the carton tray 8 is filled. The inside end 51 supports the leaflets 6 so that they do not fall down. In this manner, the leaflets 6 inside of the carton sleeve 2 are kept in a vertical orientation.

Figure 7:
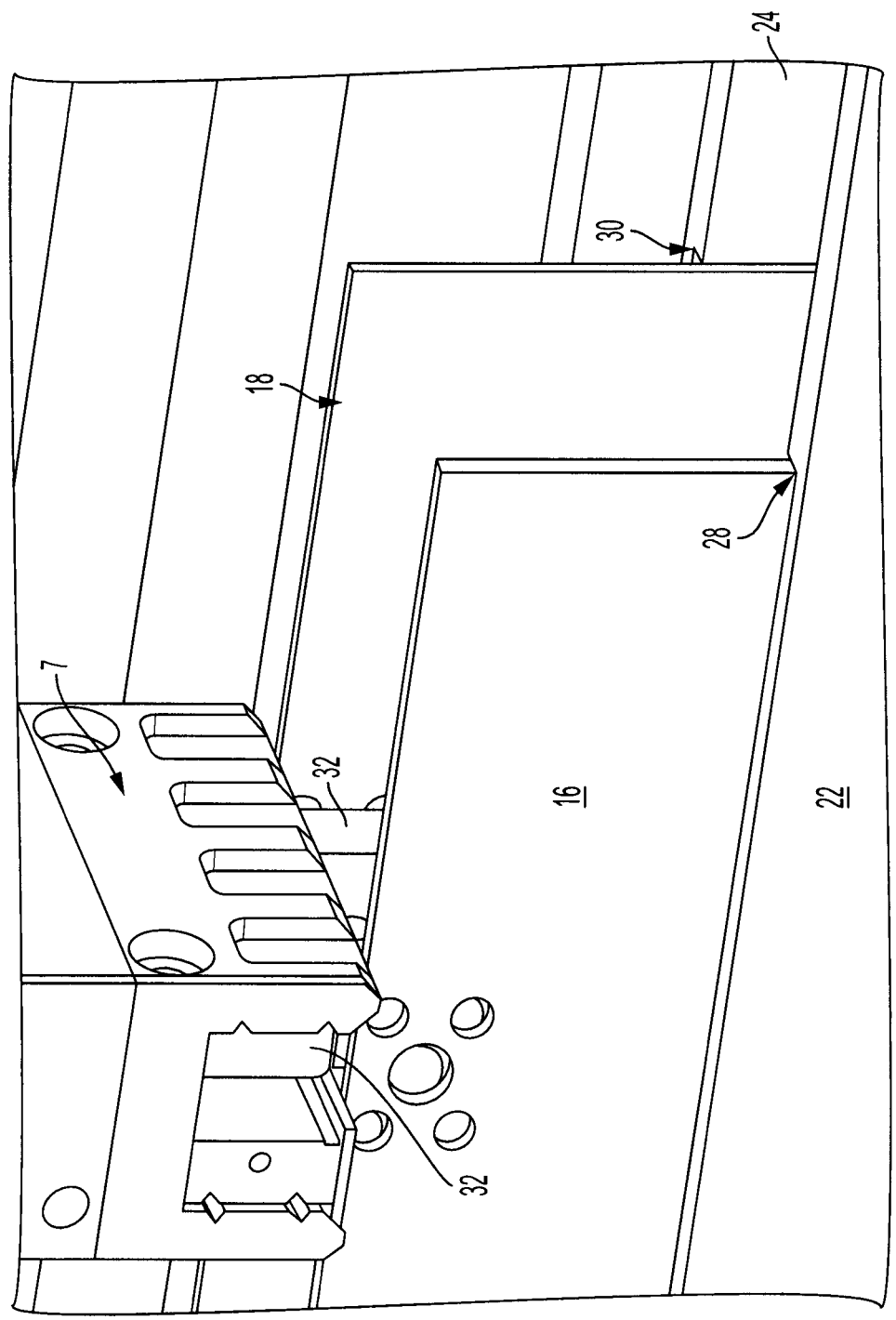
FIG. 7 is a more detailed perspective drawing of the robotic gripper of FIG. 1.

Turning now to FIG. 7, the robotic gripper 7 has two opposed gripper plates 16, 18 that hold a stack of leaflets 6 (not shown in FIG. 7) by friction. The stacking tray 12 includes two parallel opposed side plates 22, 24 between which leaflets can be stacked. The gripper plates 16, 18 are moved towards and away from each other by a pair of gripper arms 32. The gripper arms 32 are operated by pneumatic cylinders 31, 33.

The side plates 22, 24 are each provided with cutouts 28, 30 (FIG. 7). The cutouts 28, 30 allow the side plates 22, 24 of the robotic gripper 7 to fit around leaflets 6 as they are stacked between the side plates 22, 24 and beneath the robotic gripper 7.

The stacker 4 fills the stacking tray 12 with leaflets 6 until a batch of a predetermined number of leaflets 6 is pushed or is otherwise present between the plates 22, 24. The leaflets 6 press against a spring-loaded end stop 26 (FIG. 4), which keeps the leaflets 6 oriented vertically in the stacking tray 12. A spring 31 (FIG. 3) returns the end stop 26 to the leaflets 6 still contained by the stacker belts 47 after the batch of leaflets 6 has been removed from the stacking tray 12 by the robotic gripper 7 (FIG. 2).

The leaflet stuffer 9 and sleeve holder 10 will be described in greater detail. In FIG. 1, leaflet stuffer 9 and sleeve holder 10 are separated from each other, allowing the robotic gripper 7 to place a batch of folded leaflets 6 into the carton tray 8 between the leaflet stuffer 9 and sleeve holder 10. When the robotic gripper 7 is removed, the sleeve holder 10 is raised (FIG. 6) by a pneumatic cylinder 31 (FIG. 8A), and the leaflet stuffer 9 pushes the leaflets 6 into the sleeve 2 (FIG. 6) until the leaflet stuffer 9 reaches the sleeve 2. The sleeve holder 10 is then moved back into the tray 8 to retain the leaflets inside of the sleeve 2 (FIG. 2). After that, the insert stuffer 9 is returned to the position shown in FIG. 1. The leaflet stuffer 9 is operated by a pneumatic cylinder 33 (FIG. 8A).

The sleeve holder 10 has two spaced legs 40, 44 (FIG. 6), separated by an opening 42. The insert stuffer 9 has an arm 43 that extends downwardly into the carton tray. An extension 45 that is part of the arm 43 and extends outwardly towards the carton tray, and fits between the legs 40, 44, into the opening 42. The extension 45 extends beyond the leaflet stuffer 9 when it is in the opening 42 and is stopped when the leaflets 6 are entirely inside of the carton tray 8, leaving a space between the end of the carton sleeve 2 and the arm 43 that is sufficient to allow the two spaced legs 40, 44 to come down over the extension 45. In this manner, the leaflets 6 are pressed past the sleeve holder 10 (FIG. 2) so that the sleeve holder 10 can be reinserted before the leaflet stuffer 9 is withdrawn, holding the leaflets 6 in a vertical orientation.

Figure 8A:
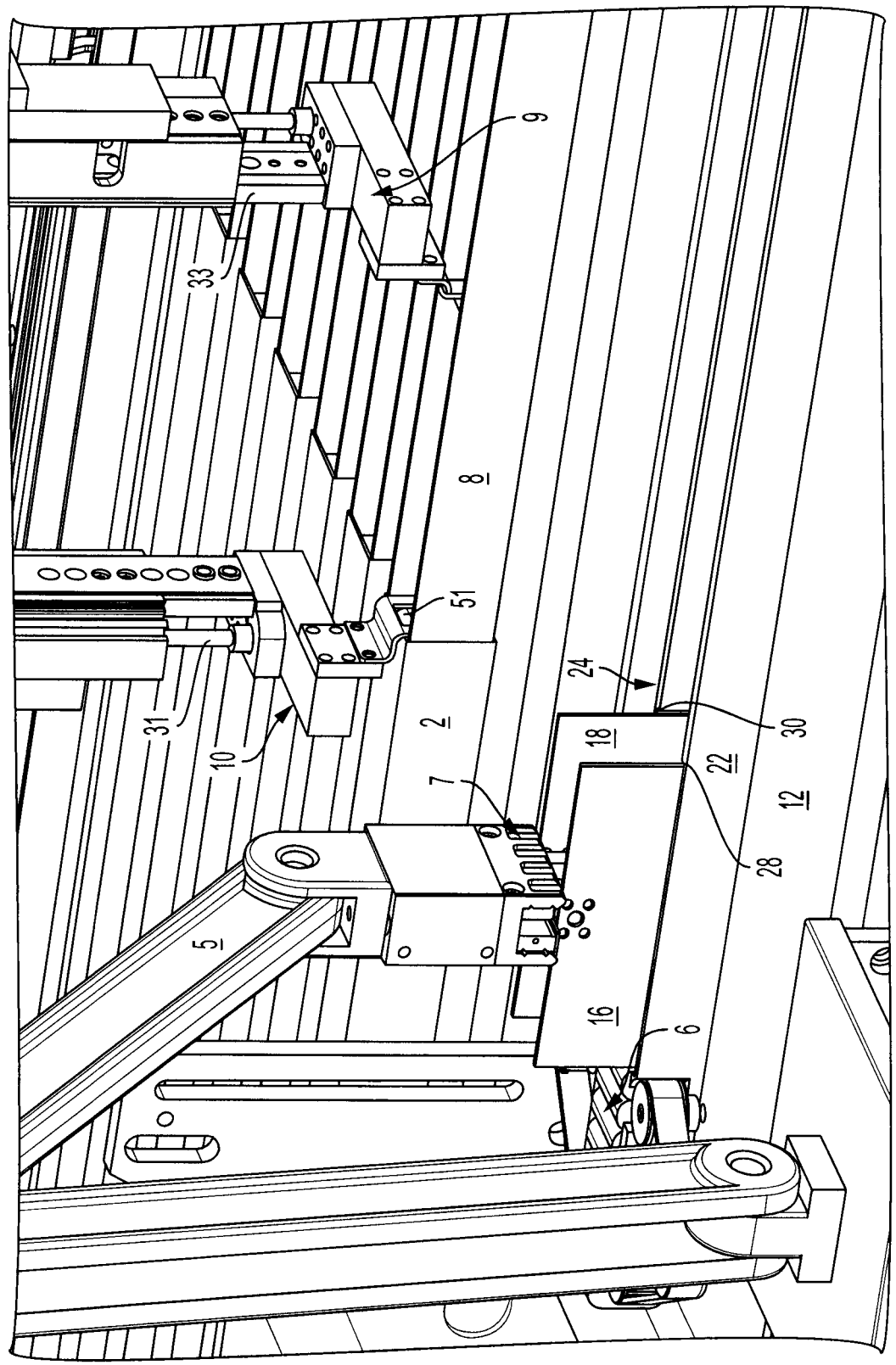
FIG. 8A is a perspective view of the apparatus of FIG. 1, awaiting leaflets.

FIGS. 8A through 8K show the operation of the tray filling apparatus in more detail. FIG. 8A shows the robotic gripper 7 as the process begins. The side plates 16, 18 are at least partially inside of the stacking tray 12, in the recessed cutouts 28, 30. The stacking tray 12 is in the process of being filled with leaflets 6. The insert stuffer 9 is shown in a retracted position while the sleeve holder 10 is inside of the carton tray 8. Before the first batch of leaflets 6 is delivered to the carton tray 8, an inside end 51 of the carton tray 8 is adjacent the sleeve holder 10.

Figure 8B:
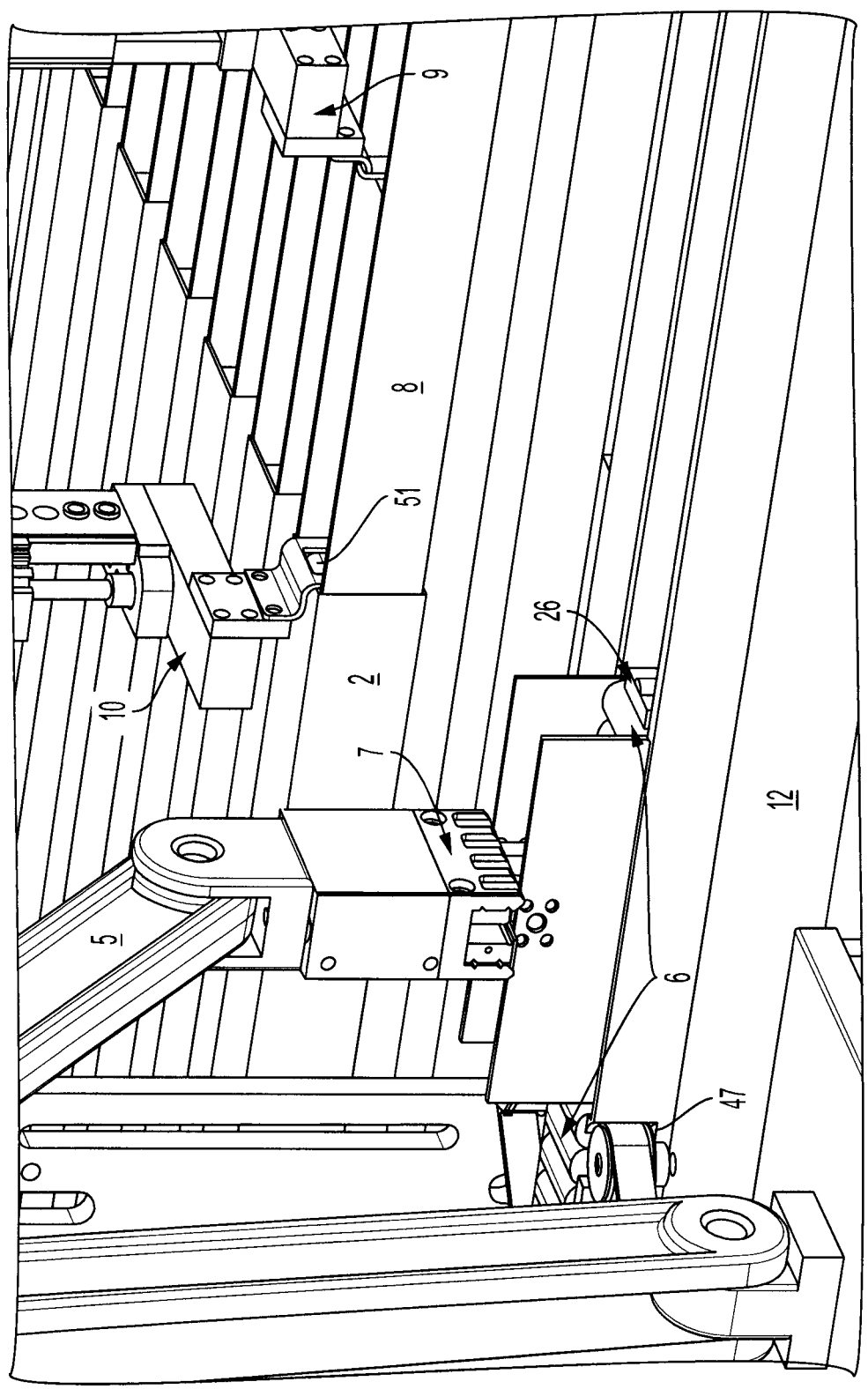
FIG. 8B is a perspective view of the apparatus of FIG. 1, showing the robotic gripper with a full batch of leaflets.

FIG. 8B is similar to FIG. 8A, but shows the robotic gripper 7 filled with a predetermined batch of folded leaflets 6, such as 10 leaflets. The end stop 26 is also shown, restraining the movement of leaflets enough to maintain their vertical orientation. When a batch is removed by the robotic gripper 7, a belt system 47 holds the next batch of leaflets 6 back until the end stop 26 returns to the next batch of leaflets 6 (FIG. 8D). The belt system 47 then releases pressure on the next leaflets 6, one at a time.

Figure 8C:
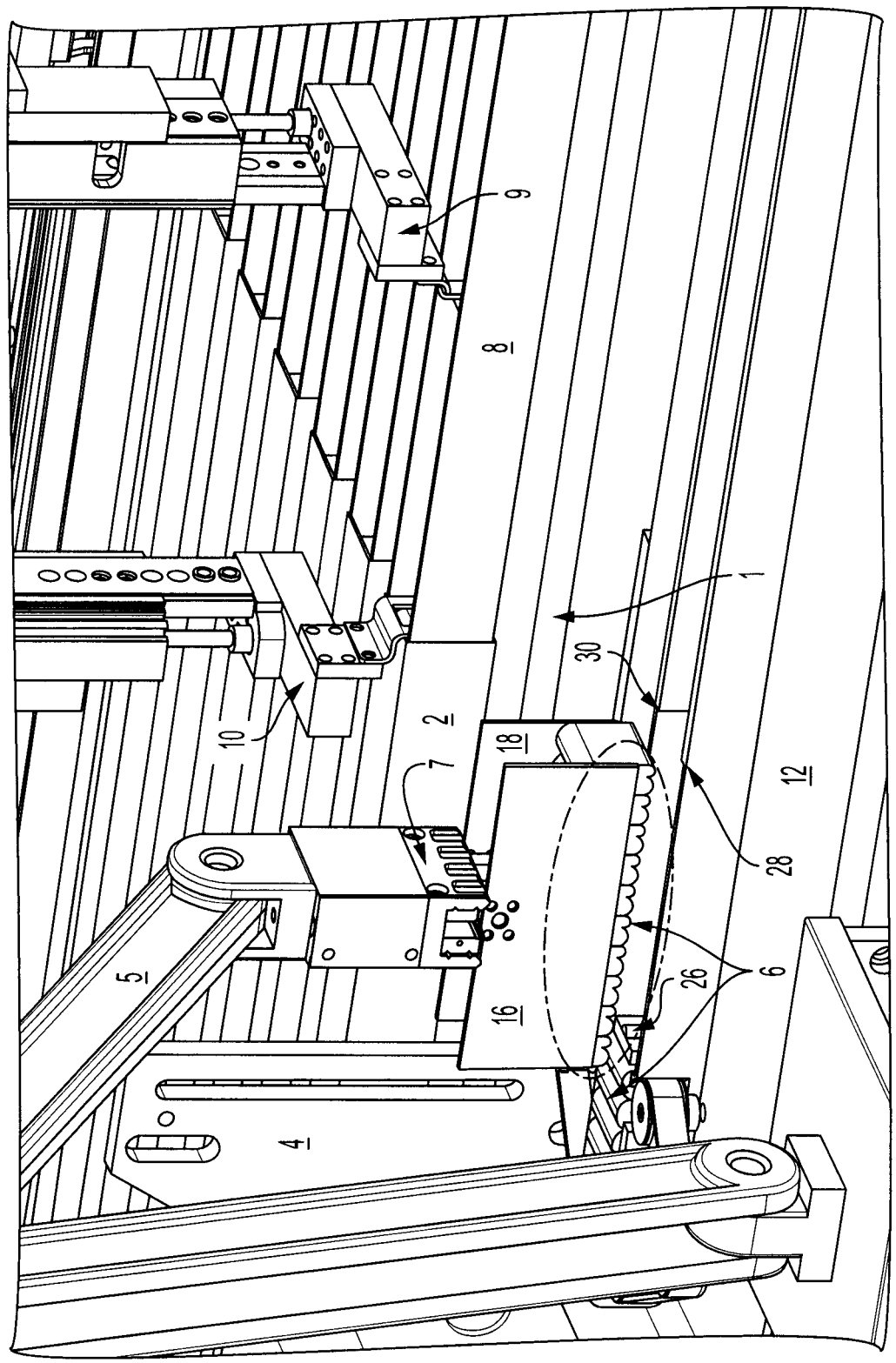
FIG. 8C is a perspective diagram of the apparatus of FIG. 1, showing the robotic arm moving a batch of leaflets.
Figure 8D:
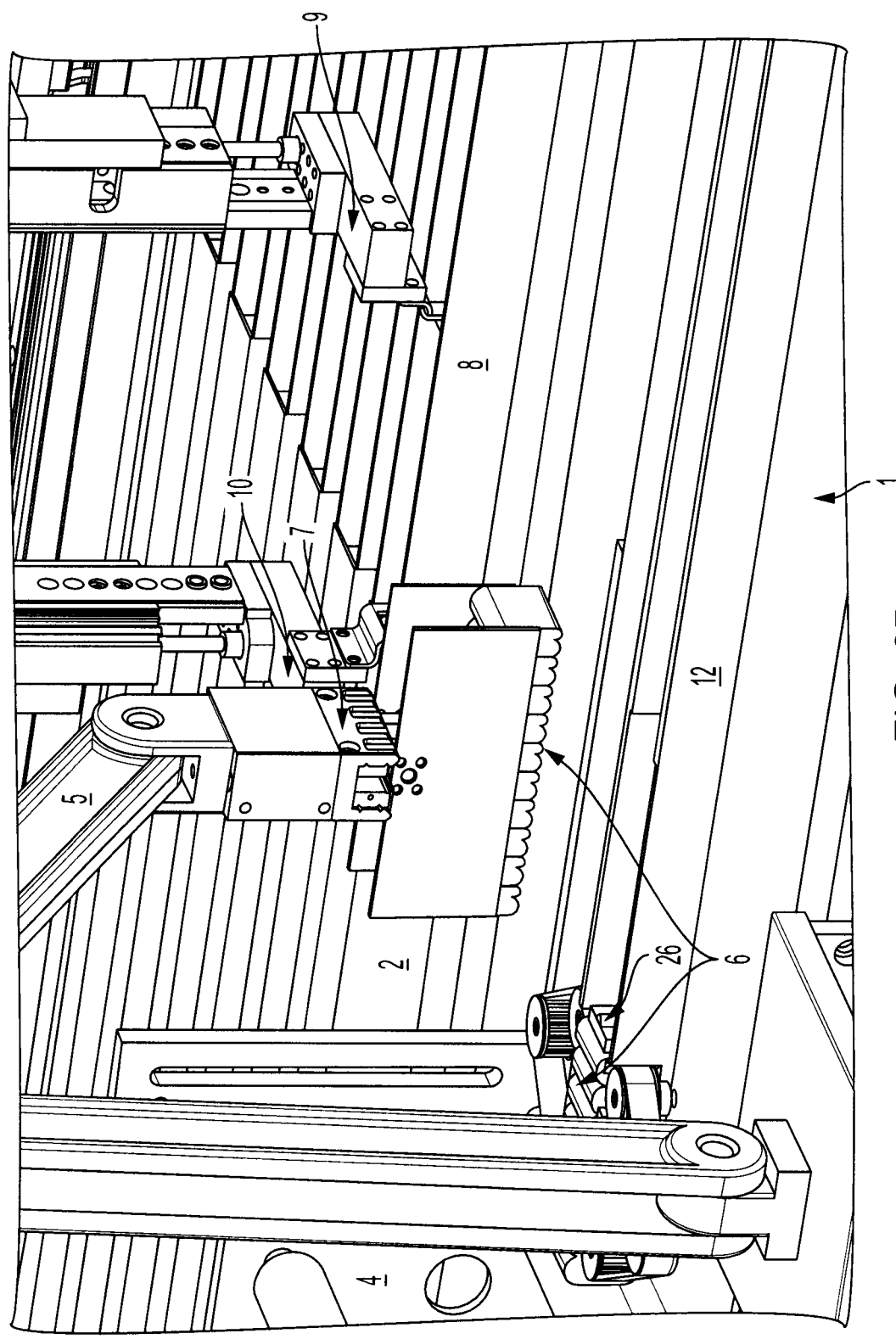
FIG. 8D is another perspective diagram of the apparatus of FIG. 1, showing the robotic arm moving a batch of leaflets.

FIG. 8C shows a robotic gripper 7 lifting a batch of leaflets 6 from the stacking tray 12.

FIG. 8D shows the robotic arm 5 moving a full batch of leaflets 6 towards the carton tray 8.

Figure 8E:
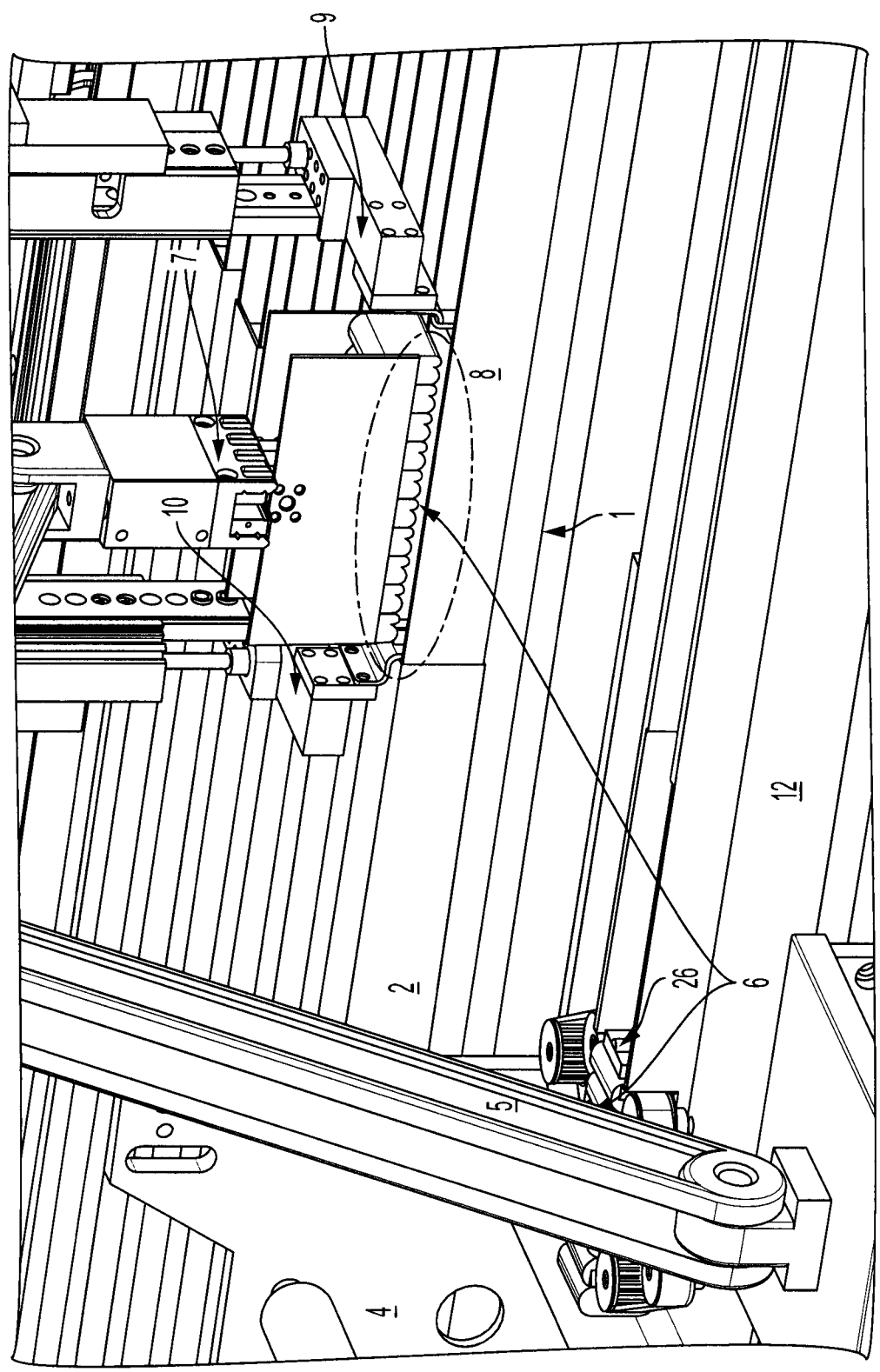
FIG. 8E is a perspective diagram of the apparatus of FIG. 1, showing the robotic gripper as it enters the tray.

FIG. 8E shows the robotic gripper 7 about to enter the carton tray 8.

Figure 8F:
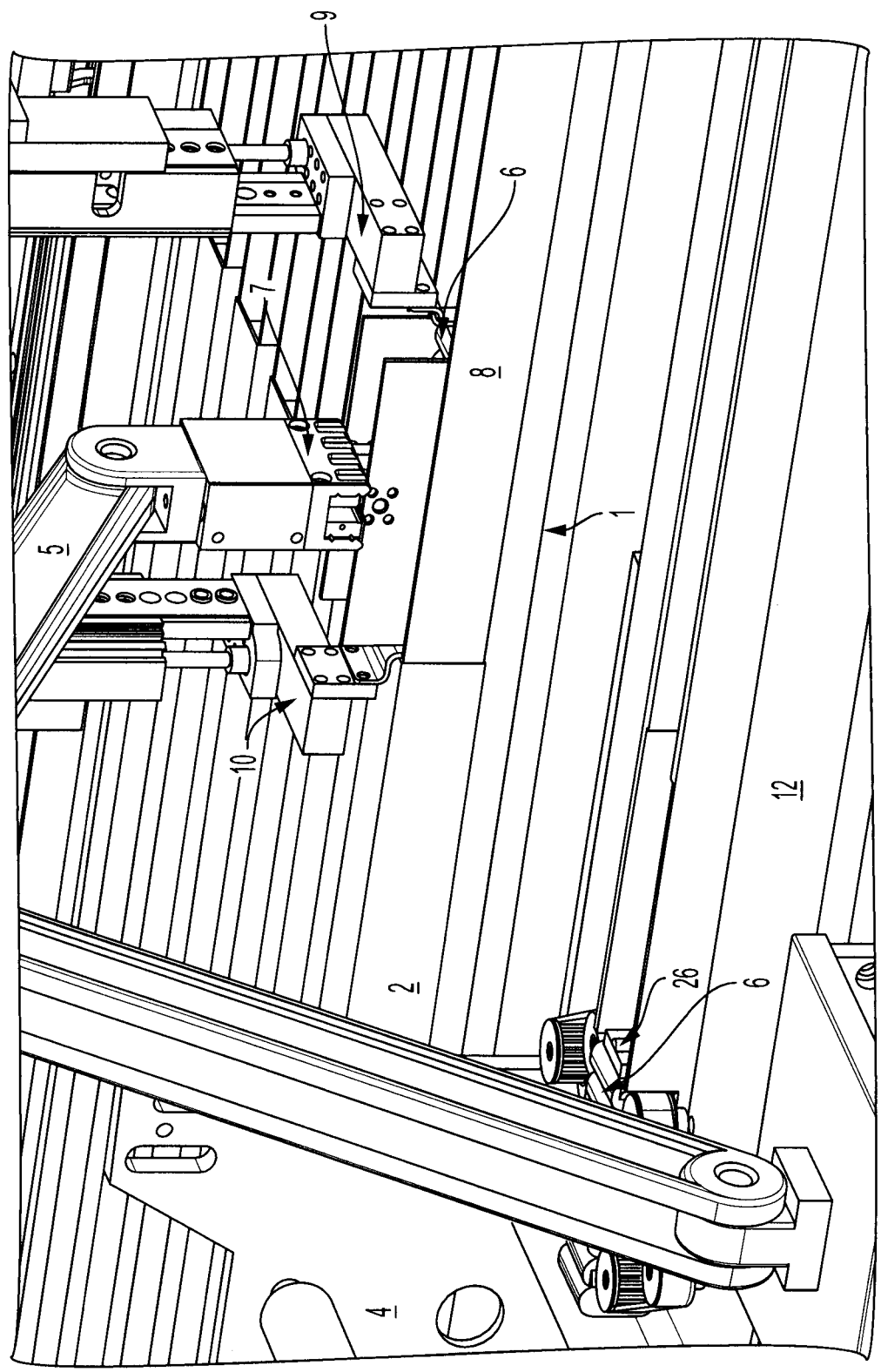
FIG. 8F is a perspective diagram of the apparatus of FIG. 1, showing a batch of leaflets lowered into the tray.
Figure 8G:
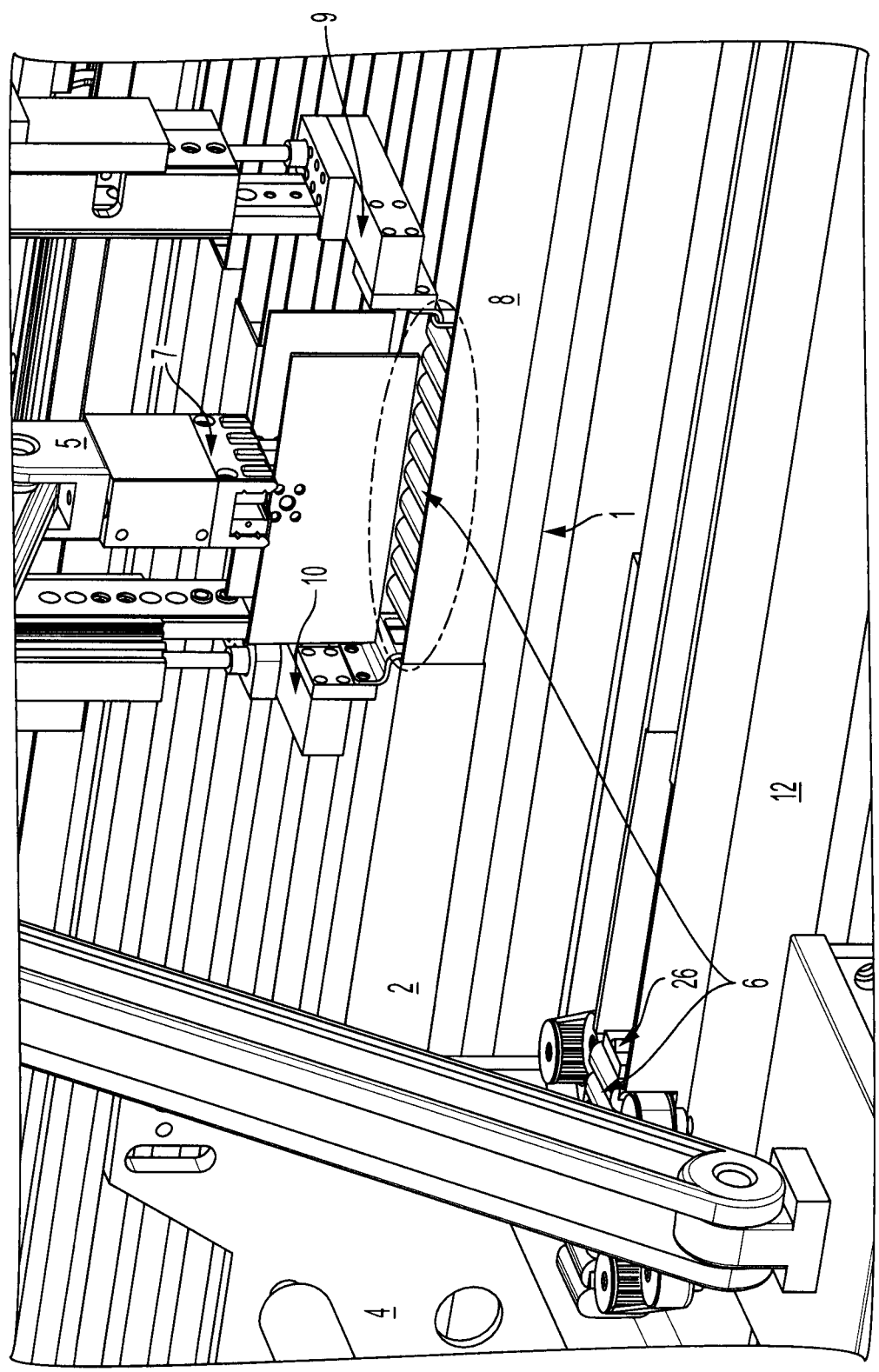
FIG. 8G is a perspective diagram of the apparatus of FIG. 1, showing a batch of leaflets after release into a tray.

FIG. 8F shows the batch of leaflets 6 being lowered into the carton tray 8, and FIG. 8G shows the batch of leaflets 6 after release into the carton tray 8.

Figure 8H:
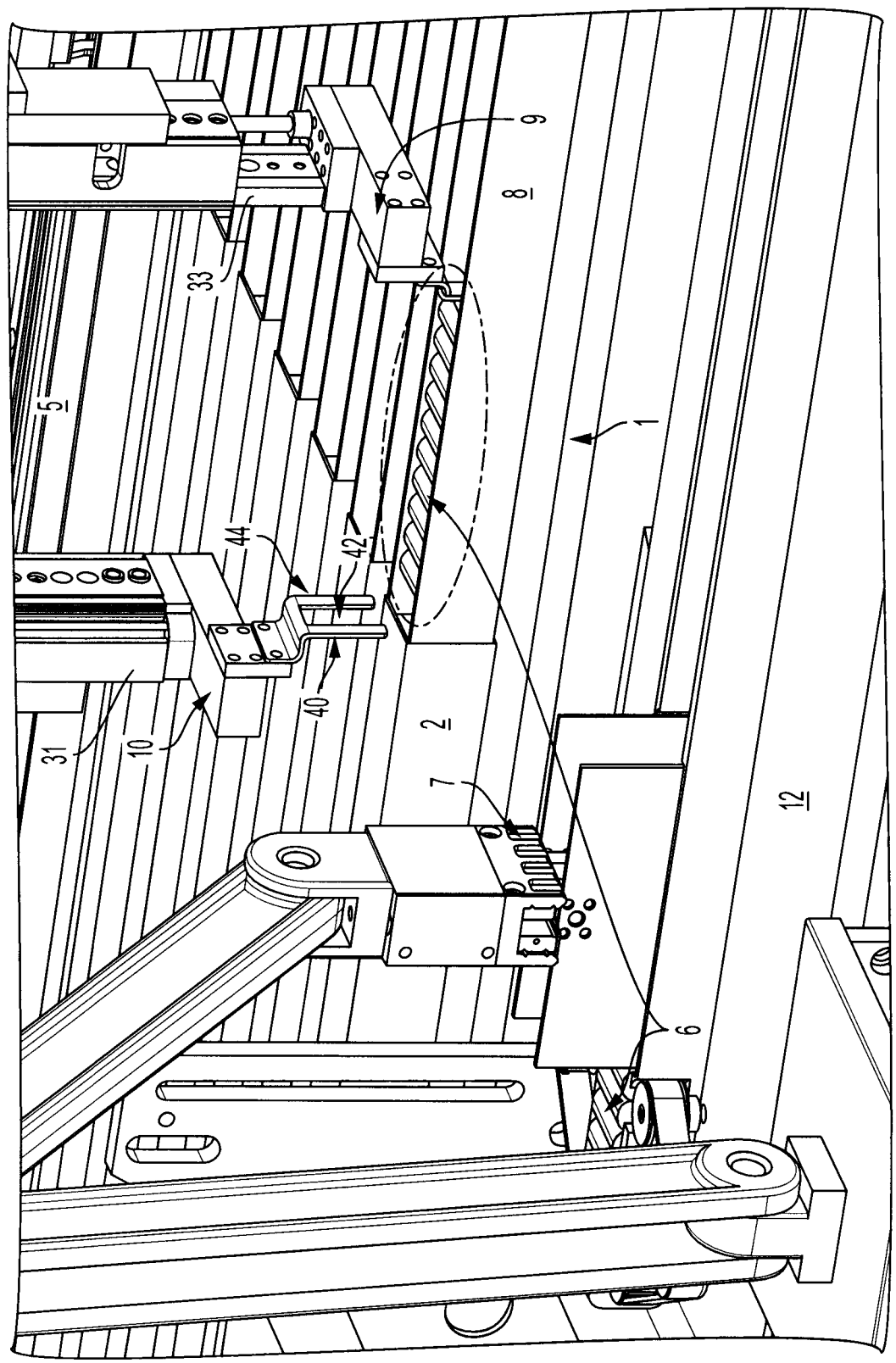
FIG. 8H is a perspective diagram of the apparatus of FIG. 1, showing the sleeve holder lifted out of the tray.

FIG. 8H shows the robotic gripper 7 as it is returned to stacking tray 12 awaiting the next batch of leaflets 6, and the sleeve holder raised prior to the leaflets being stuffed.

Figure 8I:
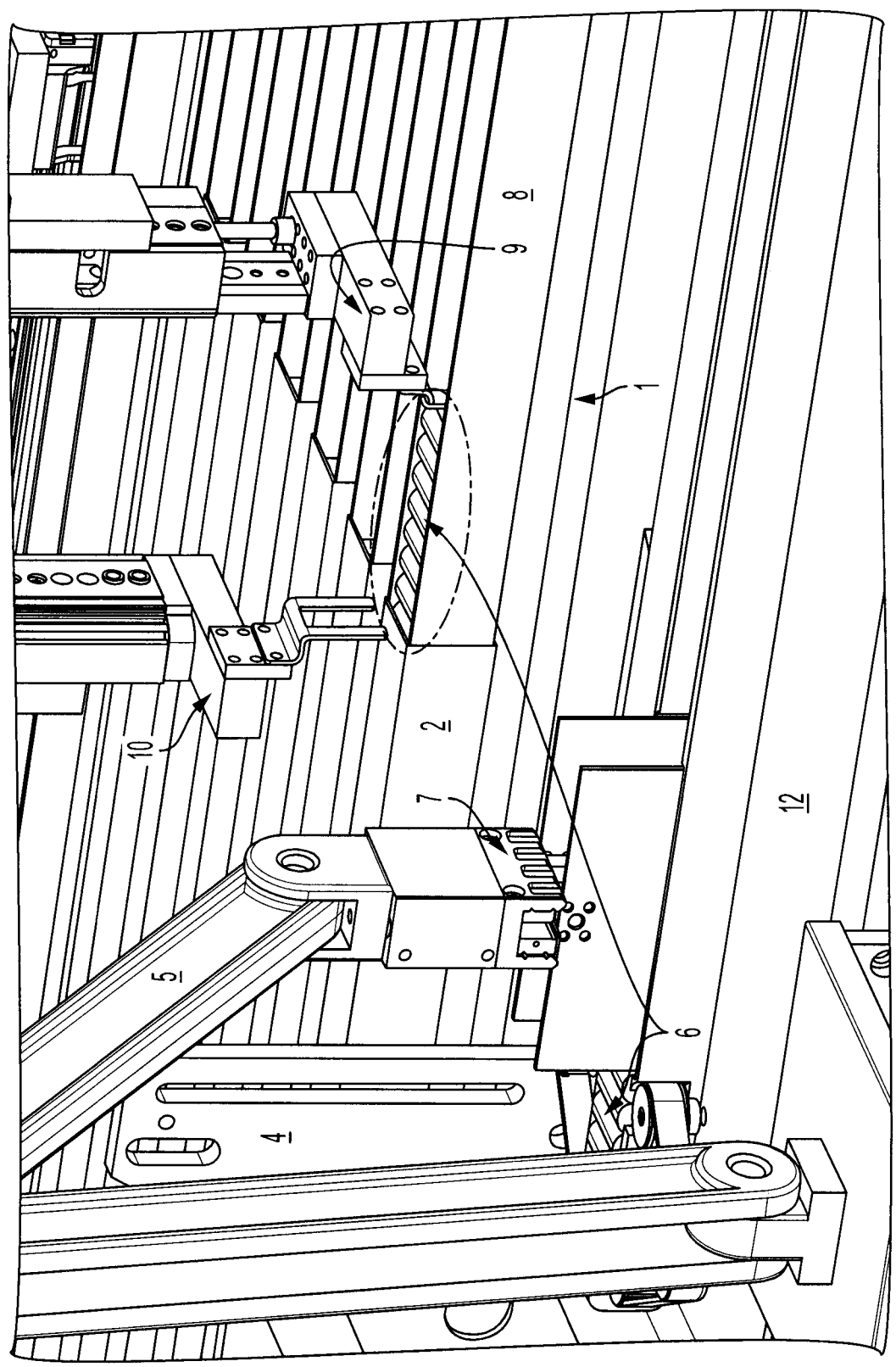
FIG. 8I is a perspective diagram of the apparatus of FIG. 1, showing the leaflets as they are pushed into the sleeve.

FIG. 8I shows the robotic gripper 7 after return to the stacking tray 12. The leaflets 6 are being pushed into the sleeve 2.

Figure 8J:
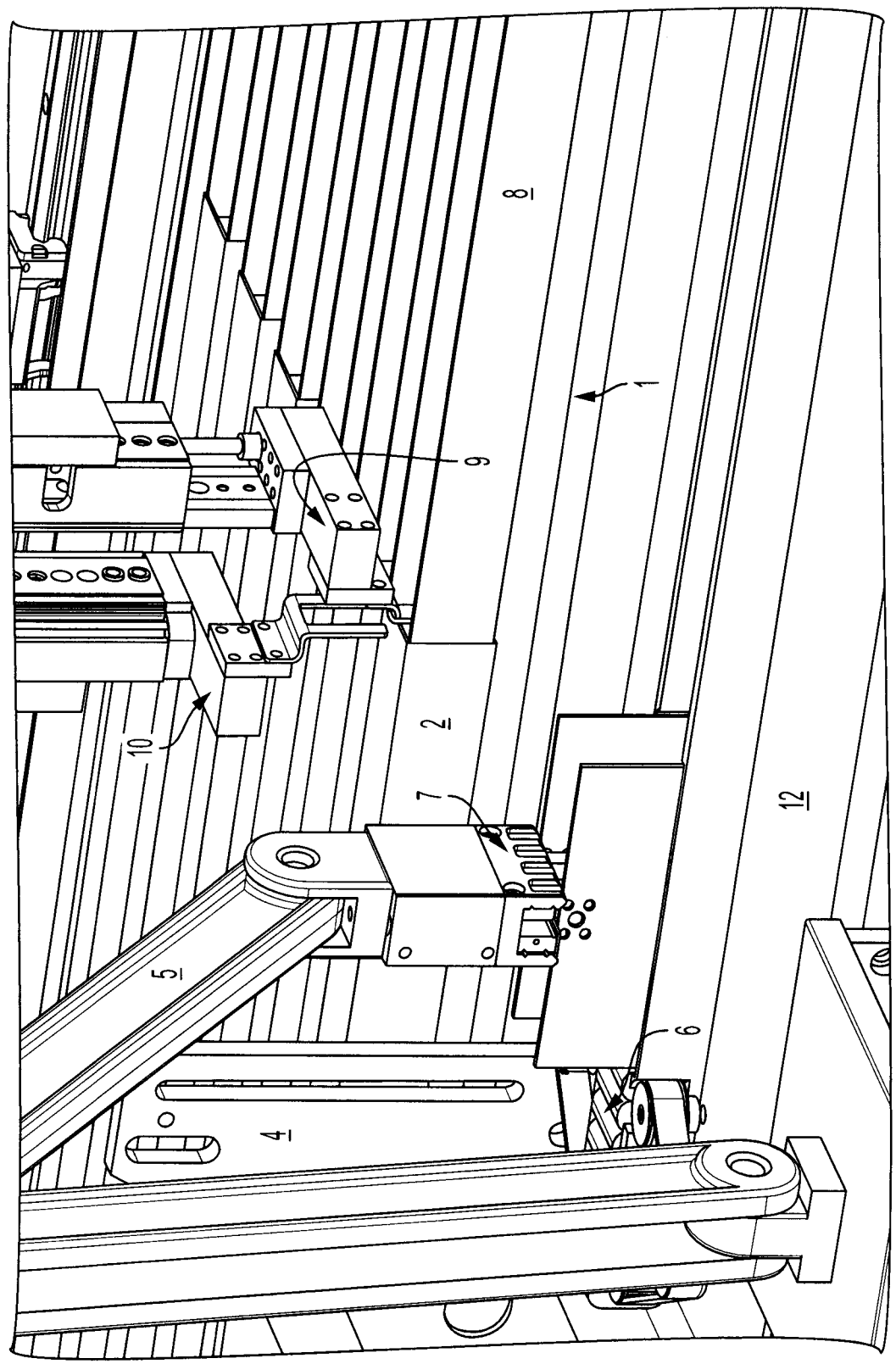
FIG. 8J is a perspective diagram of the apparatus of FIG. 1, showing the sleeve holder after the leaflets have been pushed into the sleeve.

FIG. 8J shows the sleeve holder 10 before it is pushed into the space between the sleeve 2 and the leaflet stuffer 9.

Figure 8K:
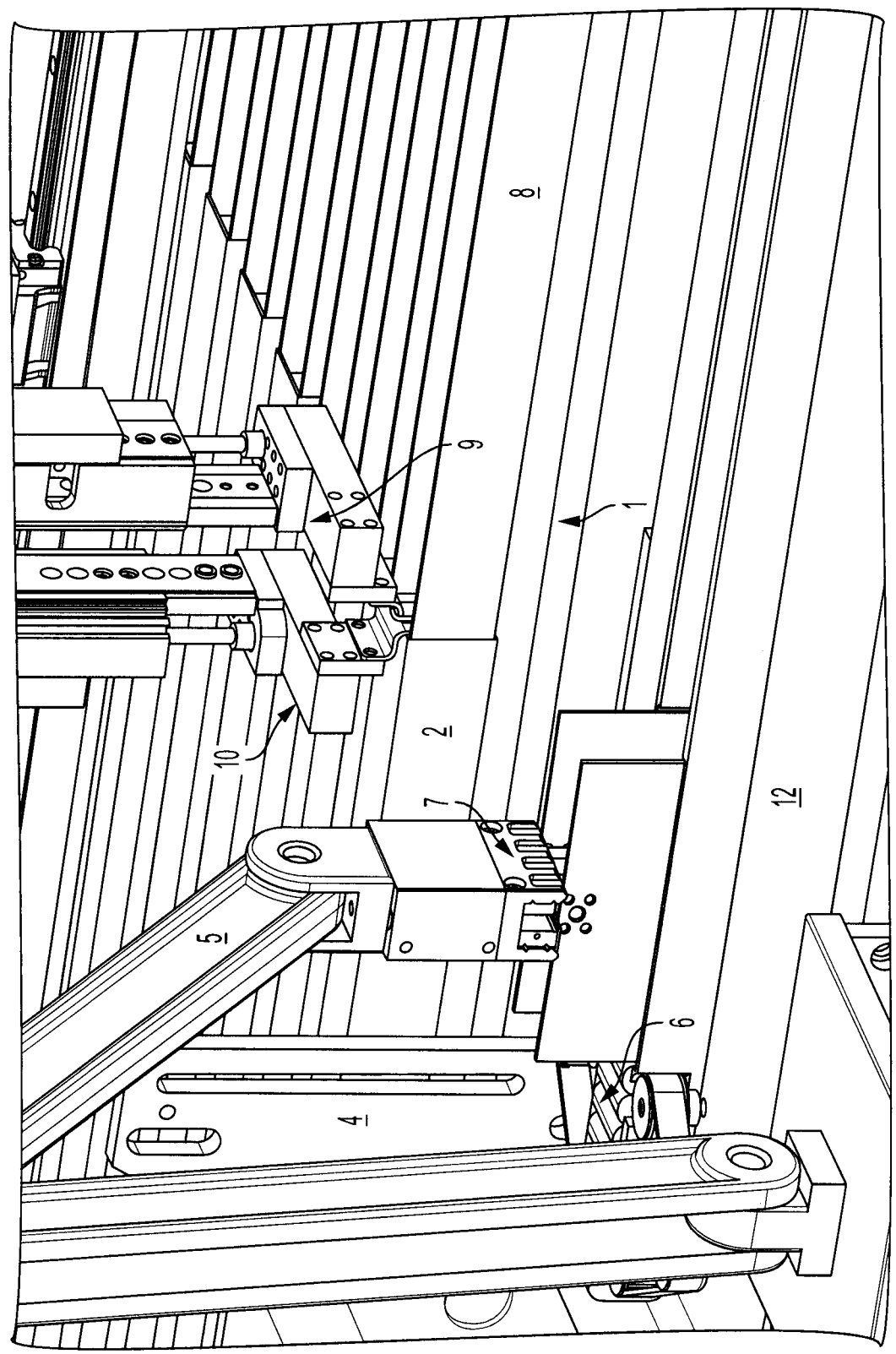
FIG. 8K is a perspective diagram of the apparatus of FIG. 1, showing the sleeve holder in the space between the leaflet stuffer and the sleeve.

FIG. 8K shows the sleeve holder 10 fully inserted in the space between the sleeve 2 and the leaflet stuffer 9.

Figure 8L:
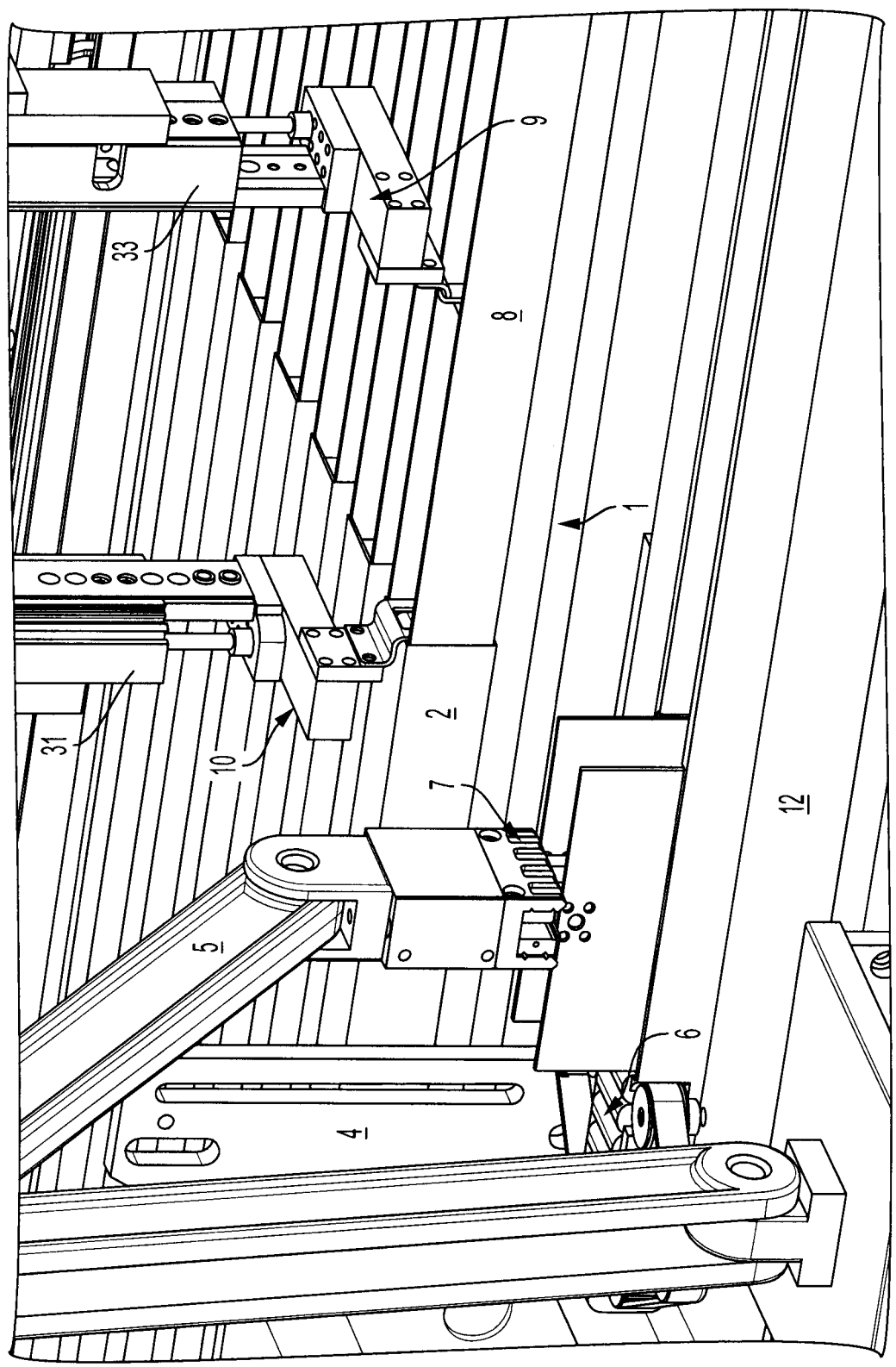
FIG. 8L is a perspective diagram of the apparatus of FIG. 1, in which all of the leaflets have been pushed into the sleeve, the leaflet stuffer has been returned to its initial position, and the robotic gripper is waiting for another batch of leaflets.

In FIG. 8L, all of the leaflets 6 have been pushed into the sleeve 2 by the insert stuffer 9, and the leaflet stuffer 9 has returned to its initial position, as seen in FIG. 8A.

The leaflets are secured in the sleeve 2 because the leaflet stuffer 9 fits in the opening 42 in the sleeve holder 10. At this point, the apparatus returns to the positions shown in FIG. 8A and the process is repeated.

Figure 9:
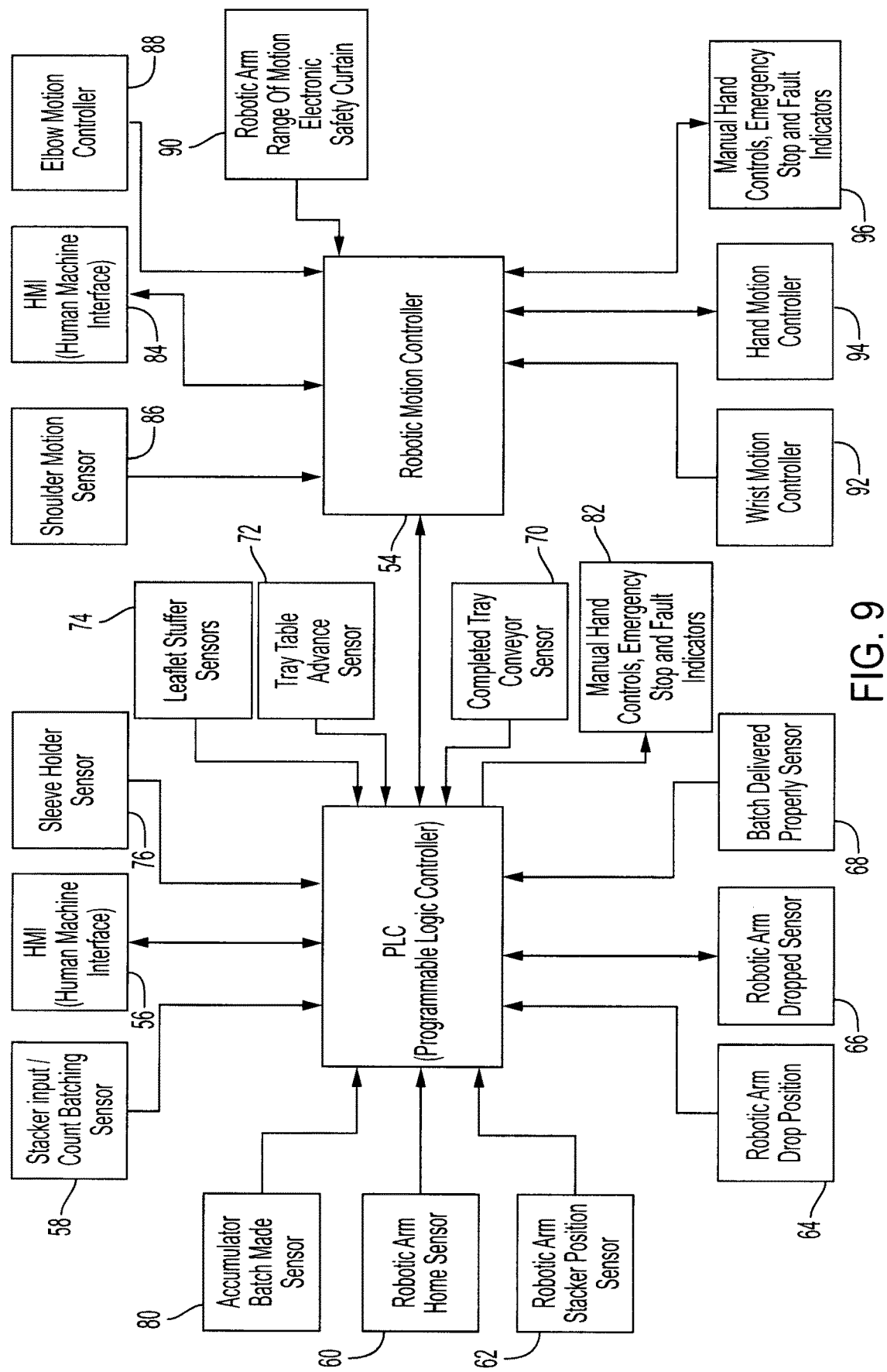
FIG. 9 is a block diagram of the control system for the apparatus of FIG. 1.

The tray filling apparatus is controlled by the controller 50 shown in FIG. 9.

The controller 50 includes a programmable logic controller (PLC) 52 and a robotic motion controller 54. The PLC 52 is programmed to control a human machine interface (HMI) 56 which can include a computer display and keyboard (not shown). The HMI 56 is provided for programming and operation monitoring activities.

The PLC 52 uses input from a stacker input/count batching sensor 58 to indicate when the robotic gripper 7 has been filled with a batch of leaflets. A robotic arm home sensor 60 tells the PLC 52 when the robotic arm 5 is in its initial position, and a robotic arm stacker position sensor 62 indicates the position of the robotic gripper 7 to the PLC 52. A robotic arm drop position sensor 64 senses whether the robotic arm 5 has reached the position shown in FIG. 8A, and a robotic arm sensor 66 confirms that the robotic gripper 7 is in the correct position.

A batch delivered properly sensor 68 informs the PLC 52 that a batch of leaflets 6 has been properly delivered to the carton tray 8, and a tray table advance sensor 72 indicates that a tray 8 has been filled, and that an empty tray 8 should be advanced. A completed tray conveyor sensor 70 senses when the empty tray has been released and a new empty tray/sleeve has been placed.

Leaflet sensors 74 reveal the position of the leaflet stuffer 9 in its open and closed positions. Sleeve holder sensor 76 informs the PLC 52 of the position of the sleeve holder 10. An accumulator batch made sensor 80 indicates that the end stop 26 has reached the position when a full batch is in the stacking tray 12. Manual hand controls and emergency stop and fault indicators 82 are provided as needed.

A conventional robotic motion controller 54 has a human machine interface (HMI) 84, a shoulder motion sensor 86, an elbow motion sensor 88, and a robotic arm range of motion electronic safety curtain 90. A wrist motion controller 92, a hand motion controller 94, and adequate manual hand controls and emergency stop fault indicators 96 are also provided.

Figure 10:
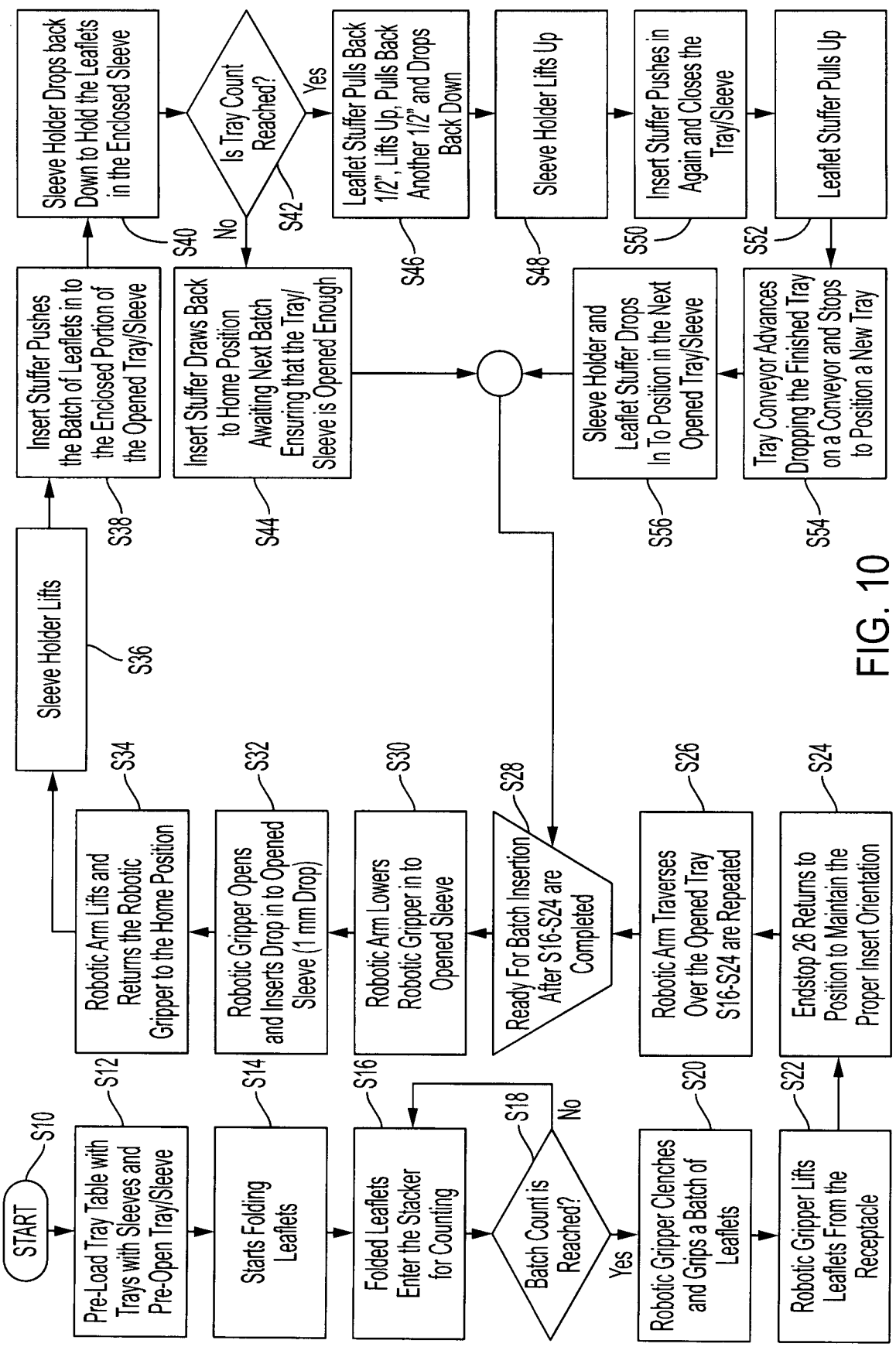
FIG. 10 is a flowchart described the program for the control system of FIG. 9.

FIG. 10 describes the software or algorithms used by the controller 50 to operate the tray filling apparatus. The algorithms will be described with reference to other drawings.

The process starts at S10. A plurality of trays are pre-loaded on the tray transport platform 1 and the trays 8 are pulled out of their respective sleeves 2 before computer control begins (S12) (FIG. 1). The number of inserts in one batch, entered by the operator, is retrieved from memory (S14). The stacker transfer machine 3 and stacker 4 start folding inserts (S14) and loading them in the stacking tray 12 (FIG. 8A) (S16). If the batch count is not reached at S18, the algorithm returns to S16 for counting and accumulating more leaflets. If the batch count has been reached, the robotic gripper 7 clenches and grips the batch of inserts at S20, and the robotic gripper 7 lifts the leaflets from the receptacle 12 at S22 (FIG. 8C). The end stop 26 slides adjacent to the next incoming leaflet at the end of the stacking tray (FIG. 8C) to maintain the proper vertical orientation of the leaflets 6, at S26.

The robotic arm 5 traverses over to an open tray 8 at S24 (FIG. 8D). When the apparatus is ready for batch insertion (S28), the robotic gripper 7 is lowered into an open tray 8 (S30) (FIG. 8E). The robotic gripper 7 is opened and leaflets 6 are dropped into the open sleeve 8 at S32 (FIG. 8F). The leaflets 6 are preferably dropped <1 mm.

The robotic arm 5 lifts up (FIG. 8G) and returns to the home position at S34. The sleeve holder 10 lifts up at S36 (FIG. 8H). The insert stuffer 9 pushes the batch of leaflets 6 into the enclosed portion of the tray 8 in the sleeve 2 at S38 (FIGS. 8I, 8J), and the sleeve holder 10 drops back down to hold the leaflets 6 in the enclosed sleeve at S40 (FIG. 8K). If the tray has not been filled with perhaps 100 leaflets (the tray count) (S42), the insert stuffer 9 is drawn back to its original position awaiting the next batch of leaflets 6 (FIG. 8L), ensuring that the tray 8 has sufficient open space at S44 to receive the next batch of leaflets 6. The software returns to S28 for another batch insertion, after S16-S24 have been repeated.

If the tray count has been reached at S42, the leaflet stuffer 9 pulls back about one half inch, lifts up, pulls back another half inch, and drops back down outside of the tray 8 at S46. The sleeve holder 10 is lifted up at S48. The leaflet stuffer 9 pushes in again and closes the rest of the tray 8 in the sleeve 2 at S50. The leaflet stuffer 9 is pulled up at S52. The tray conveyor advances, dropping the finished tray on the conveyor, and positions a new tray 8 at S54. The sleeve holder 10 and leaflet stuffer 9 drop into position in the next open sleeve tray at S56. The algorithm then returns to S28 to prepare the apparatus for another batch insertion.

While the principles of the invention have been described above in connection with specific apparatus and applications, it is to be understood that this description is made only by way of example and not as a limitation on the scope of the invention.

What is claimed is:

1. Tray filling apparatus for leaflets comprising:
    a tray transport platform, the tray transport platform supporting at least one tray sleeve and a corresponding tray,
    wherein the tray slides into the tray sleeve as the tray is filled with a predetermined number of leaflets, the tray being sufficiently secured inside of its corresponding tray sleeve so that the tray can be removed from the tray transport platform for further processing when the tray has been filled with the predetermined number of leaflets,
    a robotic arm having a robotic gripper, wherein the robot gripper is adapted to be selectively placed inside of a stacking tray, capture a batch of leaflets, the batch of leaflets having fewer leaflets than the predetermined number of leaflets, the robotic arm placing the batch of leaflets into the tray, and returning the robot gripper to the stacking tray to capture another batch of leaflets,
    a sleeve holder that is selectively placed in and removed from the tray to control entry of the leaflets into the tray sleeve, and
    a leaflet stuffer that is selectively placed in the tray to push the batch of leaflets inside of the sleeve.

2. Tray filling apparatus for leaflets comprising:
a stacker having a stacking tray which stacks the leaflets horizontally, with the leaflets themselves in a vertical orientation,
a tray transport platform, the tray transport platform supporting a plurality of tray sleeves and a plurality of corresponding trays,
wherein the trays slide into the tray sleeves as each tray is filled with a predetermined number of leaflets, each tray being sufficiently secured inside of its corresponding tray sleeve so that each tray can be removed from the tray transport platform for further processing,
a robotic arm having a robotic gripper, wherein the robotic gripper is adapted to be selectively placed inside the stacking tray, and capture a batch of leaflets, the batch of leaflets having fewer leaflets than the predetermined number of leaflets, the robotic gripper placing the batch of leaflets into a selected tray, and returning the robotic gripper to the stacking tray to capture another second predetermined number of leaflets,
a sleeve holder that is selectively placed in and removed from the selected tray to control entry of the batch of leaflets into the selected tray sleeve,
a leaflet stuffer that is selectively placed in the selected tray to push the batch of leaflets inside of the selected sleeve, and
a controller having a programmed computer and a plurality of sensors, the computer being programmed so that:
when the robotic gripper captures the batch of leaflets, the robotic arm lifts the robotic gripper from the stacking tray and places the robotic gripper in the selected tray with the leaflets held in the robotic gripper,
the leaflets are released in the selected tray by the robotic gripper, the robotic gripper is lifted away by the robotic arm, the sleeve holder is lifted out of the tray, and the leaflet stuffer pushes the batch of leaflets into the selected tray sleeve,
when the batch of leaflets has been pushed into the selected tray sleeve, the sleeve holder moves into the selected tray, the leaflet stuffer returns to its initial position, and the robotic gripper returns to the stacker tray for refilling,
whereby the batch of leaflets is transferred from the stacker to selected trays without human intervention.

3. The tray filling apparatus of claim 2, wherein the selected tray has one end that is inside of the tray selected sleeve when the filling process begins, and another end that is outside of the selected tray sleeve,
wherein, when the filling process begins, the inside end is adjacent to the selected tray sleeve and as the selected tray is filled with a first batch of leaflets and the inside end is pushed further into the selected tray sleeve as the selected tray is filled, whereby the inside end supports the leaflets so that they are kept in a vertical orientation.

4. The tray filling apparatus of claim 2, wherein the robot gripper has two opposed gripper plates that hold the batch of leaflets by friction, the stacking tray having two parallel opposed side plates the batch of leaflets being stacked between the side plates.

5. The tray filling apparatus of claim 4, comprising:
a spring-loaded end stop in the selected tray,
wherein the spring loaded end stop keeps the leaflets oriented vertically in the selected tray as the leaflets are stacked in the stacking tray, the end stop returning to an end of the stacking tray adjacent to the stacker after the batch of leaflets has been removed from the selected tray by the robotic gripper.

6. The tray filling apparatus of claim 5, wherein the side plates are each provided with cutouts sufficient to allow the gripper plates of the robotic gripper to fit around the leaflets as the leaflets are stacked between the side plates or after the batch of leaflets has been stacked in the stacking tray.

7. The tray filling apparatus of claim 2, wherein the sleeve holder has two spaced legs separated by an opening, and the leaflet stuffer has an arm that extends downwardly into the selected tray sleeve, the leaflet stuffer further having an extension extending outwardly towards the selected tray sleeve, the extension fitting between the spaced legs and into the opening of the sleeve holder, the extension extending beyond the leaflet stuffer when the extension is in the opening, leaving a space between the tray sleeve and the arm that is sufficient to allow the spaced legs to come down over the extension,
wherein the batch of leaflets is pressed past the sleeve holder so that the sleeve holder can be reinserted before the leaflet stuffer is withdrawn, holding the batch of leaflets in a vertical orientation.

8. The tray filling apparatus of claim 4, wherein the gripper plates are moved towards and away from each other by a pair of gripper arms, the gripper arms being operated by pneumatic cylinders.

9. The tray filling apparatus of claim 2, wherein the controller includes,
a programmable logic controller (PLC) and a robotic motion controller,
the PLC being programmed to control a human machine interface (HMI) which includes a computer display and keyboard, the HMI being provided for programming and operation monitoring activities,
a stacker input/count batching sensor to indicate when the robotic gripper has been filled with the batch of leaflets,
a robotic arm home sensor to the PLC when the robotic arm is in an initial position,
a robotic arm stacker position sensor that indicates the position of the robotic gripper to the PLC,
a robotic arm drop position sensor that senses whether the robotic arm is in the stacking tray,
a robotic arm sensor that confirms that the robotic gripper is in a correct position,
a batch delivered properly sensor that informs the PLC that the batch of leaflets has been properly delivered to the selected tray,
a completed tray conveyor sensor that senses when an end stop is in a position that indicates that the batch of leaflets is ready to be moved,
a tray table advance sensor that indicates when the selected tray has been filled, and that an empty tray has been advanced,
leaflet stuffer sensors indicating the position of the leaflet stuffer in open and closed positions,
a sleeve holder sensor indicating to the PLC the position of the sleeve holder, and
an accumulator batch made sensor that indicates that the end stop has reached a position in which the batch of leaflets is in the stacking tray.

10. The tray filling apparatus of claim 9, wherein the (PLC) is further programmed to determine whether the predetermined number of leaflets is in the selected tray,
if the predetermined number of leaflets is in the selected tray, the leaflet stuffer is pulled back, lifted up, pulled back further and dropped back down outside of the selected tray, the sleeve holder is lifted up, and
the leaflet stuffer is pushed in again and closes the rest of the selected tray in the selected sleeve.

\* \* \* \* \*